Patented June 23, 1953

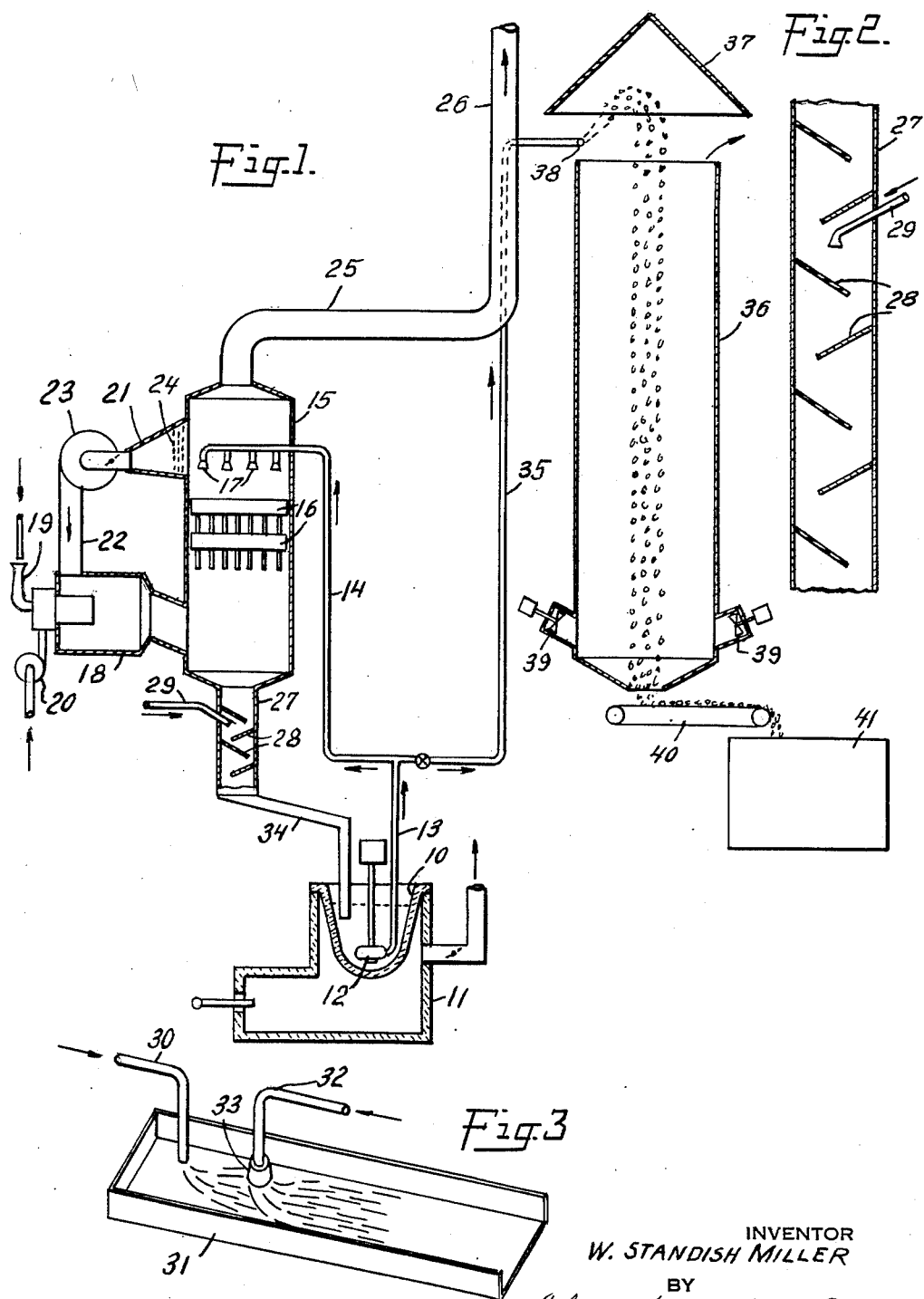

2,643,180

UNITED STATES PATENT OFFICE 2,643,180

METHOD OF PRODUCING SODIUM NITRATE

Warren Standish Miller, Houston, Tex., assignor to Mathieson Chemical Corporation, a corporation of Virginia Application November 2, 1950, Serial No. 193,637

4 Claims. (Cl. 23—102)

My invention relates to the manufacture of anhydrous sodium nitrate in the form of fused sodium nitrate from aqueous solutions of sodium nitrate. It particularly provides a system for manufacturing solid anhydrous sodium nitrate in the form of prills or small pellets employing aqueous solutions of sodium nitrate as starting material. In this country sodium nitrate is commonly produced by neutralizing nitric acid with soda ash, sodium bicarbonate or caustic soda. Hence the material domestically produced is in aqueous solution and as an article of commerce must be reduced to a solid state by crystallization and separation or by some means of dehydration. Probably the form of sodium nitrate of greatest commercial demand is the prilled product which is made by spraying molten sodium nitrate in a prilling tower where the sprayed droplets cool and solidify in falling and the resulting small pellets or prills are collected as the product.

The reduction of aqueous solutions of sodium nitrate to anhydrous state so that the material can be fused for spraying or other handling without conventional evaporation, crystallization, filtration and drying presents a number of difficulties. Sodium nitrate fuses at 308° C. but is heat sensitive and begins to decompose to sodium nitrite at an appreciable extent when the temperature reaches 380° C. Consequently, temperature and/or time of heating must be carefully controlled. Moreover, addition of an aqueous solution to a body of previously fused sodium nitrate with a view to flashing off the water must be avoided because of the danger of explosive generation of steam. In addition, contacting molten sodium nitrate with a relatively cool aqueous stream creates serious handling problems in the way of localized cooling results in troublesome solidification and plugging. Accordingly, the art has considered it necessary to first obtain crystalline sodium nitrate from aqueous solutions by evaporation and cooling followed by separation of the crystals from the mother liquor. The crystals are then dried in a separate operation before melting to produce the fused anhydrous sodium nitrate.

I have now devised a system for producing fused anhydrous sodium nitrate direct from aqueous sodium nitrate solutions which is particularly adapted to the manufacture of sodium nitrate prills. According to my invention molten sodium nitrate is circulated through a heating zone in which it is rapidly superheated to approximately 350° to 400° C. Aqueous sodium nitrate, usually obtained by the conventional neutralization reaction is intimately and rapidly mixed in a mixing zone with the superheated melt which is maintained in the form of a flowing shallow stream. Steam flashed off in the mixing operation is removed from the mixing zone and a stream of the molten sodium nitrate is sprayed into a prilling tower while the balance of the molten sodium nitrate is recycled to maintain the operation.

The circulating stream of molten sodium nitrate is rapidly superheated just prior to the mixing zone and is rapidly cooled to below decomposition temperature by the contact with the cool aqueous solution in the mixing zone. The introduction of aqueous solution is controlled at a rate which maintains the system in a steady state. In this way, the melt can be superheated above the decomposition range, e. g. by use of heating gases at temperatures as high as about 700° C. in direct contact with the melt with insignificant decomposition into sodium nitrite. Since sodium nitrate begins to decompose into nitrite at the rate of about 2 per cent per hour at 380° C., I limit the melt temperature to approximately 350° to 400° C. before the addition of aqueous solution. The melt is maintained at a temperature from about 312° to 365° C. after mixing. In the mixing zone, the water in the aqueous feed solution flashes to steam and the sodium nitrate in the solution becomes part of the melt without passing through the solid state, or, if the solid is formed at all, it melts so quickly that the solid cannot be detected.

It is essential to maintain the circulating melt in the form of a flowing shallow stream in the mixing zone in order to obtain rapid and homogeneous mixing at as low a melt temperature as possible without solidification or plugging occasioned by localized sub-cooling. The depth of the stream or film of melt must be small at all points in the mixing zone so that the steam produced by mixing cannot form below the surface of the melt and create the hazard of violent displacement of fused salt by explosive steam generation. By my process of dehydration, the necessity of crystallizing, separating and drying sodium nitrate crystals from solution and remelting the crystals are all avoided, and the sodium nitrate is converted from solution form to molten anhydrous sodium nitrate in a single operation. The operating equipment required thus is greatly reduced and the capital investment cost of a plant is minimized.

The process steps and method of handling the materials involved are illustrated in Figure 1 of the accompanying drawings. Examples of equipment useful for carrying out the method of my invention are further indicated in Figures 2 and 3 of the accompanying drawings.

In Figure 1 of the drawing, fused sodium nitrate is circulated from melting pot 10 which is heated by a conventionally fired heater 11. The circulating melt is lifted by pump 12 through lines 13 and 14 to an upper portion of packed or baffled tower 15. As shown, the tower is fitted with vertical slat packing 16 which has the advantages of low presure drop and clean drainage. The circulating melt is distributed over the packing by a system of nozzles 17 or any appropriate distribution system such as a set of weir boxes with drain spouts, distributing nozzles and splash plates.

The baffled tower 15 provides a superheating zone in which the descending droplets of fused sodium nitrate may be directly heated by countercurrent contact with hot gases produced in gas fired, rotolouvre type air heater 18. Fuel gas is supplied to the heater through burner 19 and air by fan 20. The bulk of the hot gases advantageously are recirculated through ducts 21 and 22 by means of fan 23. Spray baffles 24 are provided at the head of duct 21 to knock out entrained droplets of sodium nitrate. Excess gases together with steam from the dehydration step are vented through duct 25 and stack 26.

The superheated melt drains from tower 15 into the top of baffled column or chamber 27 which is constructed with staggered baffles 28 designed to cause the superheated melt to flow down over the baffles in the form of a thin film, shallow stream or shallow layer. The aqueous solution, advantageously in the form of a concentrated neutral solution of sodium nitrate, at sufficient temperature to avoid crystallization is introduced through connectoin 29 at an upper point of baffled chamber 27 so that mixing will be complete before the melt leaves the base of the baffled chamber 27 and so that the depth of the stream or film of melt at all points remains very small in order that steam produced by mixing cannot form below the surface of the melt. Steam evolved in the dehydration passes overhead from chamber 27 through tower 15 and into duct 25 with the exit flue gases. Chamber 27 is shown in greater detail in Figure 2, and of course it may or may not form an integral part of the superheating tower 15. Indeed it may be open at both ends if desired to facilitate escape of steam.

Alternatively, as shown in Figure 3, the superheated melt may be introduced as by line 30 into a pan or weir 31 and flowed as a shallow stream or shallow layer of melt across the inclined surface of the weir plate. The aqueous sodium nitrate feed is introduced through line 32 and nozzles system 33 just above the flowing film of fused sodium nitrate. The point of introduction is located far enough above the weir outlet to permit adequate mixing and dehydration time.

The product stream comprising dehydrated and fused feed solution and the cooled melt circulated through tower 15 drains from baffle chamber 27 through line 34 back into melting pot 10. In the preferred application of my invention directed to conversion of aqueous sodium nitrate to anhydrous sodium nitrate prills in a unitary operation, the net make of fused anhydrous sodium nitrate is lifted by pump 12 through valved line 35 to the top of prilling tower 36. The prilling tower 36 is equipped with a large metal hood 37. The fused melt is sprayed into the space at the top of the prilling tower 36 formed by the hood through a system of nozzles 38, and the droplets of fused sodium nitrate descend through the tower against a rising current of air introduced at the bottom of the prilling tower 36 by means of fans 39. Solidified droplets of sodium nitrate or prills drop from the prilling tower 36 onto conveyor 40 for removal to storage in 41. In following the procedure of my invention, for example, a neutral sodium nitrate solution of about 59 per cent concentration at about 80° C. is prepared by reaction of dry soda ash with 60 per cent nitric acid in a neutralization tank equipped with agitation equipment and a duct system for removal and/or recovery of carbon dioxide gas. The neutralization is controlled by pH, and the tank may be equipped with steam coils or steam jacketed to maintain a temperature preventing crystallization. Final pH adjustments are conveniently made in one or more additional tanks which may serve as feed tanks to the prilling process. The temperature in the melting pot 10 is maintained at about 350° C. and the circulating melt is heated to about 385° C. in tower 15 by direct contact with the hot flue gases which are about 500° to 700° C. The materials of construction should be such as to resist attack by the circulating fused salt and such as to avoid contamination of the sodium nitrate. An all metal system is preferred, advantageously employing cast iron for the contact surfaces. The use of ceramic materials should be avoided. The prill tower may be constructed of smooth sheet metal or stainless steel and should be of sufficient height to provide solidification time against the cooling air flow and of sufficient cross-sectional area to minimize wall contact.

My invention therefore provides a safe, efficient and convenient system for simultaneously dehydrating and fusing sodium nitrate from aqueous solution without intermediate crystallization from solution with its associated steps of cooling, evaporating, filtering and drying. The fused and dehydrated product is in particularly advantageous form for conversion to prill form without remelting. Sodium nitrate prills may be economically and continuously produced as a result in a plant of high capacity and fine heat economy. Operating costs are low. Circulation ratios of the order of 3:1 or lower may be employed, and decomposition is minimized by rapidly superheating only a portion of the melt and rapidly absorbing the excess heat by intimate admixture with the aqueous feed while preventing localized solidification.

I claim:

1. The method of manufacturing sodium nitrate prills from aqueous sodium nitrate solutions which comprises circulating molten sodium nitrate through a heating zone, superheating the circulating melt to approximately 350° to 400° C., flowing a shallow layer of the superheated melt through a mixing zone wherein the depth of the layer is sufficiently shallow to release the steam produced by contacting the superheated melt with aqueous sodium nitrate without causing violent displacement of the melt by explosive steam generation, adding the aqueous sodium nitrate at a controlled rate to the flowing shallow layer at a point providing intimate and rapid contact with the melt within the mixing zone, removing flashed steam from the mixing zone, removing sodium nitrate from the mixing zone in fused form, spraying molten sodium nitrate into a prilling tower and recycling molten sodium nitrate to the heating zone.

2. The method of manufacturing sodium nitrate prills from aqueous sodium nitrate solutions which comprises circulating molten sodium nitrate through a heating zone, superheating the circulating melt to approximately 350° to 400° C., flowing a film of the superheated melt downwardly through a mixing zone, adding aqueous sodium nitrate at a controlled rate to the flowing film at a point providing complete mixing time within the mixing zone, removing flashed steam from the mixing zone, removing sodium nitrate from the mixing zone in fused form, spraying molten sodium nitrate into a prilling tower and recycling molten sodium nitrate to a heating zone.

3. In the production of sodium nitrate in fused form directly from aqueous sodium nitrate solutions, the method which comprises circulating molten sodium nitrate through a heating zone, superheating the circulating melt to approximately 350° to 400° C., flowing a shallow layer of the superheated melt through a mixing zone wherein the depth of the layer is sufficiently shallow to release the steam produced by contacting the superheated melt with aqueous sodium nitrate without causing violent displacement of the melt by explosive steam generation, adding the aqueous sodium nitrate at a controlled rate to the flowing shallow layer at a point providing intimate and rapid contact with the melt within the mixing zone, removing flashed steam from the mixing zone, and recovering sodium nitrate in fused form from the mixing zone.

4. In the production of sodium nitrate in fused form directly from aqueous nitrate solutions, the method which comprises circulating molten sodium nitrate through a heating zone, superheating the circulating melt to approximately 350° to 400° C., flowing a film of the superheated melt downwardly through a mixing zone, adding aqueous sodium nitrate at a controlled rate to the flowing film at a point providing complete mixing time within the mixing zone, removing flashed steam from the mixing zone, and recovering sodium nitrate in fused form from the mixing zone.

W. STANDISH MILLER.

References Cited in the file of this patent

UNITED STATES PATENTS

| Number | Name | Date |
|---|---|---|
| 1,920,289 | Booth et al. | Aug. 1, 1933 |
| 1,937,757 | Gleason | Dec. 5, 1933 |
| 2,019,112 | Beekhuis | Oct. 29, 1935 |
| 2,022,037 | Hanchett | Nov. 26, 1935 |
| 2,181,688 | Walker | Nov. 28, 1939 |
| 2,375,898 | Bruijn | May 15, 1945 |
| 2,528,407 | Yeandle | Oct. 31, 1950 |